United States Patent [19]

Schmickl

[11] Patent Number: 4,882,115
[45] Date of Patent: Nov. 21, 1989

[54] ELECTROLYTIC CAPACITOR AND METHOD FOR PRODUCING AN ELECTROLYTIC CAPACITOR

[75] Inventor: Helfried Schmickl, Maria Saal, Austria

[73] Assignee: U.S. Philips Corporation, New York, N.Y.

[21] Appl. No.: 281,292

[22] Filed: Dec. 7, 1988

[30] Foreign Application Priority Data

Dec. 17, 1987 [AT] Austria .................................. 3339/87

[51] Int. Cl.$^4$ ............................................. H01G 9/00
[52] U.S. Cl. ...................................... 361/538; 29/570.1
[58] Field of Search ......................... 29/25.42, 570.1; 361/306, 511, 534–540

[56] References Cited

U.S. PATENT DOCUMENTS

| | | | |
|---|---|---|---|
| 3,585,468 | 6/1971 | Chertok et al. ................ | 361/524 X |
| 3,648,337 | 3/1972 | Greskamp et al. ............. | 29/25.42 |
| 3,718,844 | 2/1973 | Brazier ........................... | 29/25.42 X |
| 4,255,779 | 3/1981 | Meal ............................... | 361/309 X |

Primary Examiner—Donald A. Griffin
Attorney, Agent, or Firm—Norman N. Spain

[57] ABSTRACT

In an electrolytic capacitor with connecting leads (6, 7) embedded in the side walls (4, 5) of a dish-shaped housing section (1) which receives a capacitor cell (18), the said leads extend at least for a portion, in the direction away from the base (2) of the dish-shaped housing section, essentially parallel to the capacitor cell, the ends (11, 12) of the connecting leads emerging into the receiving space for the capacitor cell and connected to the adjacent electrode connections (22, 23) of the capacitor cell being angled in an L shape towards the face of the capacitor cell facing away from the base of the dish-shaped housing section without making contact with each other (FIG. 6). According to a method for producing such an electrolytic capacitor, the connection (24, 25) of the electrode connections (22, 23) of the capacitor cell (18) to the ends (11, 12) of the connecting leads (6, 7) emerging from the dish-shaped housing section (1) into the receiving space for the capacitor cell is made outside the dish-shaped housing section (1).

14 Claims, 4 Drawing Sheets

ELECTROLYTIC CAPACITOR AND METHOD FOR PRODUCING AN ELECTROLYTIC CAPACITOR

BACKGROUND OF THE INVENTION

The invention relates to an electrolytic capacitor having a synthetic resin housing which forms a receiving space for a capacitor cell and which consists of a dish-shaped housing section which essentially accommodates the capacitor cell having lateral electrode connections, and a lid-shaped housing section which hermetically seals said dish-shaped housing section, connecting leads, which originate from outside the dish-shaped housing section, emerge at one end into the receiving space for the capacitor cell and are connected at said end to the adjacent electrode connection of the capacitor cell, being embedded in the side walls of the dish-shaped housing section adjacent to the electrode connections of the capacitor cell. Such an electrolytic capacitor, embodied in the so-called chip construction and which as is used, for example, for surface mounting on printed circuit boards, is known from Published Specification WO 85/00463. In this known electrolytic capacitor, the connecting leads embedded in the side walls of the dish-shaped housing section are passed transversely through the side walls, which has the consequence that the connecting leads are embedded in the side walls of the dish-shaped housing section only along a relatively short portion. Such an embedding of the connecting leads along only a relatively short portion corresponding to the wall thickness of the side walls makes it difficult to seal the housing in the region where the connecting leads are embedded as a result there is risk of a leakage of the electrolyte contained in the receiving space for the capacitor cell along region where the connecting leads are embedded in the housing. Such a leakage of the electrolyte from the housing may result in an impairment of the mode of operation or a reduction in the service life of the electrolytic capacitor.

SUMMARY OF THE INVENTION

A principal object of the invention is to achieve, in an electrolytic capacitor of the type cited in the introduction, a particularly good seal along the connecting leads embedded in the side walls of the dish-shaped housing section and, consequently, a satisfactory mode of operation and a long service life of the electrolytic capacitor. According to the invention, for this purpose the connecting leads embedded in the two side walls of the dish-shaped housing section extend at least for a portion, in the direction away from the base of the dish-shaped housing section, essentially parallel to the capacitor cell and the ends of the connecting leads which emerge into the receiving space for the capacitor cell and are connected to the adjacent electrode connections of the capacitor cell are angled in an L shape towards the face of the capacitor cell facing away from the base of the dish-shaped housing section without making contact with each other. In this manner, the result is achieved that the connecting leads are embedded in the side walls of the dish-shaped housing section along a relatively long portion, which produces a relatively long creep path for the electrolyte contained in the receiving space for the capacitor cell, and the risk of a leakage of electrolyte from the housing is thus substantially reduced.

It should be noted that an electrolytic capacitor is known from Japanese Published Specification 60-177.612 in which the housing is formed by two dish-shaped housing sections which accommodate essentially about half each of the capacitor cell formed in this case as a capacitor winding, which results in relatively low side walls of the dish-shaped housing sections. In the side walls of one of the two dish-shaped housing sections there are embedded connecting leads which extend in the direction away from the base of the dish-shaped housing section, extend parallel to the adjacent end faces of the capacitor winding and emerge at the upper side of the side walls into the receiving space for the capacitor winding where they are then angled in the region of the electrode connections emerging approximately centrally from end faces, while making contact with the upper side of the side walls, towards said electrode connections and are connected to them. As a result of the fact that the side walls of said dish-shaped housing section have only a relatively low height, since they only extend up to about the center of the capacitor winding, the connecting leads are also embedded, in the side walls only along relatively short portions. As a result, as in the capacitor described in the above-mentioned published specification WO 85/00463, only a relatively short creep path for the electrolyte contained in the receiving space for the capacitor winding, and this again results in difficulties in relation to a satisfactory sealing of the housing. On the other hand, according to the invention, the connecting leads are embedded in the relatively high side walls of one dish-shaped housing section which accommodates the capacitor cell essentially in its entirety, which accordingly produces relatively long creep paths for the electrolyte contained in the receiving space for the capacitor winding and, consequently, a good and satisfactory sealing of the housing is obtained.

It has proven to be advantageous if the ends of the connecting leads angled towards the capacitor cell in an L shape, together with the electrode connections connected to them, rest on the capacitor cell and press the latter against the base of the dish-shaped housing section. As a result of the capacitor cell being pressed against the base of the dish-shaped housing section in this way, the capacitor cell is securely held in the dish-shaped housing section and also protected against vibrations to which the electrolytic capacitor may be exposed, and as a result of this the service life of the electrolytic capacitor is likewise prolonged.

In relation to a very good sealing of the housing, it has proven to be advantageous that the connecting leads have at least one bend in their course in the region of their portions embedded in the dish-shaped housing section. Compared with a linear course of the portions of the connecting leads embedded in the dish-shaped housing section, the provision of at least one bend in the course of the embedded portions of the connecting leads produces both a longer embedding distance for the connecting leads, and consequently a longer creep path for the electrolyte contained in the receiving space for the capacitor cell, and also a firmer and more reliable embedding of the connecting leads. These have an advantageous effect on the sealing of the housing of the electrolytic capacitor. Various possibilities are available for forming one such bend in the course of the embedded portions of the connecting leads or a plurality of such bends. Thus, the connecting leads may have, for example, zigzag, meandering or undulating bends in the region of their embedded portions.

In this connection it has furthermore proven to be advantageous when the connecting leads have a bend essentially formed as an angulation in the region of the base of the dish-shaped housing section and emerge from the side wall of the dish-shaped housing section on the outside thereof with the angled portion of the said bend. In this manner, a very reliable embedding of the connecting leads in the side walls of the dish-shaped housing section and also a lengthening of the embedded portions of the connecting leads and consequently a very good sealing of the housing of the electrolytic capacitor are likewise obtained.

For the purpose of obtaining very good sealing of the housing, it has also proven to be advantageous in the case of an electrolytic capacitor which has connecting leads of the strip-type construction that the connecting leads be provided, in the region of their portions embedded in the dish-shaped housing section, with at least one cutout which extends transversely to the plane of the strip and which reduces the cross-sectional area of the connecting leads in the region thereof. As a result of this, a particularly reliable anchoring of the connecting leads embedded in the dish-shaped housing section is obtained and, at the same time, formation of crevices extending along the embeddings of the connecting leads as a result of different shrinkage and expansion behaviors of the housing and of the connecting leads is prevented.

In order to obtain a very good sealing of the housing, it has likewise proven advantageous in the case of an electrolytic capacitor which has connecting leads of strip-type construction that the connecting leads are provided, in the region of their portions embedded in the dish-shaped housing section, with at least one indentation which extends transversely to the plane of the strip. As a result of this, a reliable anchorage of the connecting leads embedded in the dish-shaped housing section is obtained.

Further, for the purpose of obtaining in relation to a very good sealing of the housing, it has furthermore proven to be advantageous, in the case of an electrolytic capacitor in which at least the connecting leads emerging into the receiving space for the capacitor cell consist of a valve metal, if the connecting leads consisting of a valve metal are provided, at least in the region of their portions embedded in the dish-shaped housing section, at least partially on their surface with a barrier layer encompassing them circumferentially. In this manner, a surface formation of the connecting leads is obtained which, in interaction with the plastic material of the dish-shaped housing section, has improved adhesive properties, which likewise produces a more reliable embedding of the connecting leads in the dish-shaped housing section. Moreover, the electrocapillary forces which favor a leakage of electrolyte in the region of the connecting lead of the capacitor cell on the anode side are reduced, which likewise produces an improvement in the sealing of the housing of the electrolytic capacitor.

In this connection it has proven to be advantageous when the chosen barrier voltage of the barrier layer is higher than the voltage with which the capacitor cell is formed in accordance with its operating voltage. In this manner, the electrocapillary forces which favor a leakage of electrolyte in the region of the connecting lead of the capacitor cell on the anode side are virtually completely eliminated, which produces a further improvement in the sealing of the housing of the electrolytic capacitor.

In order to obtain relation to a particularly good sealing of the housing, it has proven to be particularly advantageous if the connecting leads are surrounded by at least one sealing element adhering firmly to the connecting leads, circumferentially encompassing them annularly and consisting of a synthetic resin, at least essentially in the region of their portions embedded in the dish-shaped housing section. In this manner, a particularly reliable sealing around the connecting leads embedded in the dish-shaped housing section is obtained, very largely independently of the choice of material for the housing.

In this connection it has proven to be very advantageous if the sealing element consists of a heat-resistant elastically compliant synthetic resin. In this manner, it is possible to compensate particularly reliably for the different shrinkage and expansion behaviors of the housing and the connecting leads. In this connection, a silicone rubber may preferably be used as the material for the sealing element.

In this connection, it has furthermore proven to be advantageous if at least one sealing element surrounding a connecting lead is completely embedded in the dish-shaped housing section. In this manner, a particularly good sealing of the housing is obtained.

In this connection, it has also proven to be advantageous if at least one sealing element surrounding a connecting lead is disposed immediately adjacent to the portion of the connecting lead embedded in the dish-shaped housing section at one or both of its two points of emergence from the dish-shaped housing section, adjacent to the same. Such a measure also produces a very good sealing of the housing. Such a sealing element may be provided either at the point of emergence of a connecting lead from the dish-shaped housing section debouching into the receiving space for the capacitor cell or at its point of emergence leading outwards in relation to the housing. If desired, such sealing elements may, however, also be disposed at both points of emergence of a connecting lead from the dish-shaped housing section.

Furthermore, the invention also relates to a method for producing an electrolytic capacitor in which connecting leads which originate from outside a housing section of dish-shaped construction are embedded in the side walls of the same, one end of which connecting leads emerges into a receiving space designed for a capacitor cell, after which the capacitor cell, provided with lateral electrode connections, is inserted into the dish-shaped housing section with the electrode connections that are adjacent to the ends of the connecting leads emerging into the receiving space designed for the capacitor cell and the electrode connections are connected to those ends of the connecting leads, and subsequently a lid-shaped housing section is placed on the dish-shaped housing section and hermetically joined to the latter. Such a method for producing an electrolytic capacitor is also known from the Published Specification WO 87/00463 cited in the introduction. Since in this known electrolytic capacitor the connecting leads pass through the side walls of the dish-shaped housing section transversely and end in the interior of the receiving space for the capacitor cell, in this case constructed as a capacitor stack, the electrode connections emerging laterally from the capacitor stack have to be connected in the interior of the receiving space for the capacitor stack to the ends of the connecting leads, and this makes a relatively complicated working procedure necessary.

Another object of the invention is to simplify a method as described above. According to the invention this is achieved by a method in which at least portions of the connecting leads are embedded in the side walls so that they extend in the direction away from the base of the dish-shaped housing section, essentially parallel to the side walls of the latter, their ends emerging into the receiving space designed for the capacitor cell and being sufficiently long so that, extending essentially parallel to the side walls, they project beyond the dish-shaped housing section. The capacitor cell is then inserted into the dish-shaped housing section with its lateral, angled electrode connections extending parallel to the capacitor cell. After which its electrode connections outside the dish-shaped housing section are connected to the ends of the connecting back in the region of the ends of the connecting leads projecting beyond the dish-shaped housing section. Subsequently, said ends of the connecting leads projecting beyond the dish-shaped housing section, together with the electrode connections of the capacitor cell connected to them, are angled in an L shape towards the face of the capacitor cell facing away from the base of the dish-shaped housing section without making contact with each other. The lid-shaped housing section is there placed on the dish-shaped housing section and the two housing sections are hermetically joined to each other. In this manner, the result is achieved that the connection of the ends of the connecting leads to the electrode connections of the capacitor cell can be carried out completely outside the dish-shaped housing section, as a result of which particularly reliable connections can be achieved in a simple production operation, which is very important for a satisfactory mode of operation of the electrolytic capacitor. Even if an electrolyte is already contained in the receiving space for the capacitor cell before the ends of the connecting leads are joined to the electrode connections of the capacitor cell, the fact that said connections are made completely outside the housing dish ensures that virtually no electrolyte can reach the region of the parts to be connected to each other, which could otherwise, as is known, impair the quality of the connections.

It should be noted that, in the case of the electrolytic capacitor known from Japanese Published Specification 60-177.612 already mentioned before, the ends of the connecting leads are connected to the electrode connections of the capacitor cell in the immediate vicinity of the upper side of the side walls of the dish-shaped half of the housing, the electrode connections resting on the angled ends of the connecting leads situated adjacent to the upper side of the side walls of the dish-shaped half of the housing. This means that the electrode connections can be connected to the ends of the connecting leads only from one side, as a result of which, however, the reliability of the connections may be impaired. In addition, there is the risk that electrolyte which may already be contained in the receiving space for the capacitor cell may reach the upper side of the side walls of the dish-shaped housing section and, consequently, the region of the electrode connections and the ends of the connecting leads to be connected to each other, which would likewise impair the reliability of said connections, as already mentioned. On the other hand, in the method according to the invention, the ends of the connecting leads are connected to the electrode connections of the capacitor cell completely outside the dish-shaped housing section at a point where the parts to be connected to each other are accessible on both sides so that they may, for example, be gripped in a pincer-like manner to produce the connections, as a result of which very reliable connections are obtained. In addition, there is no danger in this case that an electrolyte which may already be contained in the receiving space for the capacitor cell can reach the region of the electrode connections and the ends of the connecting leads to be connected to each other. In this manner, therefore, the connection of the ends of the connecting leads to the electrode connections of the capacitor cell can be produced particularly reliably and simply.

In this connection it has proven to be particularly advantageous if, in the course of angling the ends of the connecting leads projecting beyond the dish-shaped housing section, together with the electrode connections connected to them, towards the face of the capacitor cell facing away from the base of the dish-shaped housing section, said leads are pressed against the face of the capacitor cell facing away from the base of the dish-shaped housing section and, consequently, the capacitor cell is held pressed against the base of the dish-shaped housing section. In this manner, it is ensured that the capacitor cell is reliably held in the housing and is protected against any vibrations.

DETAILED DESCRIPTION OF THE INVENTION

Figure 1:
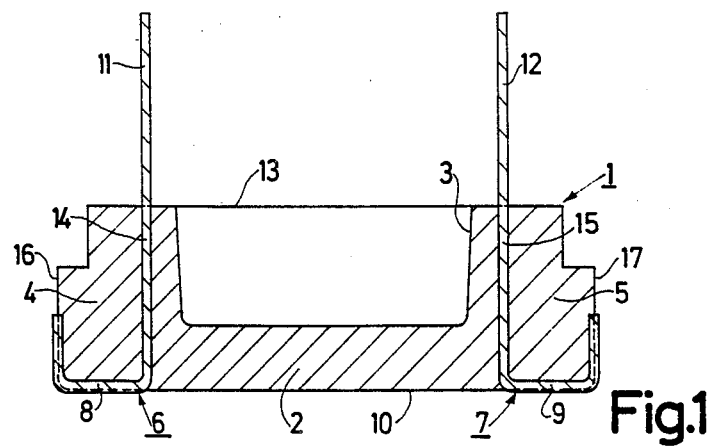
FIGS. 1-6 show various steps in the production of an electrolytic capacitor of the invention.
Figure 2:
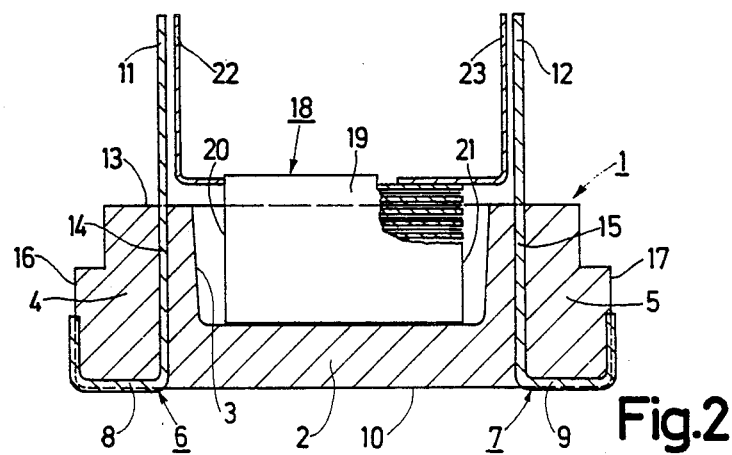
Figure 3:
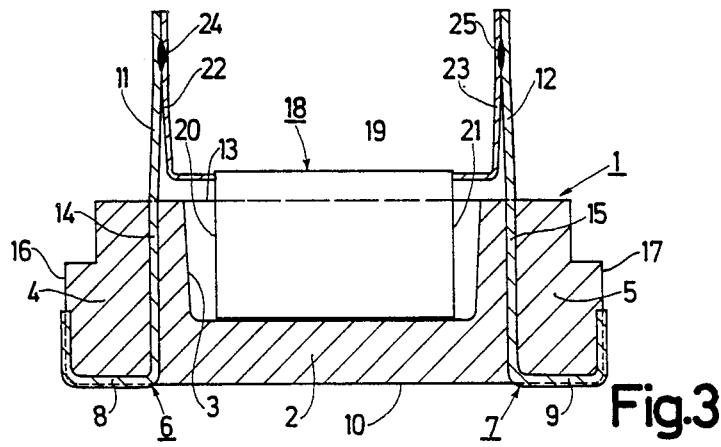
Figure 4:
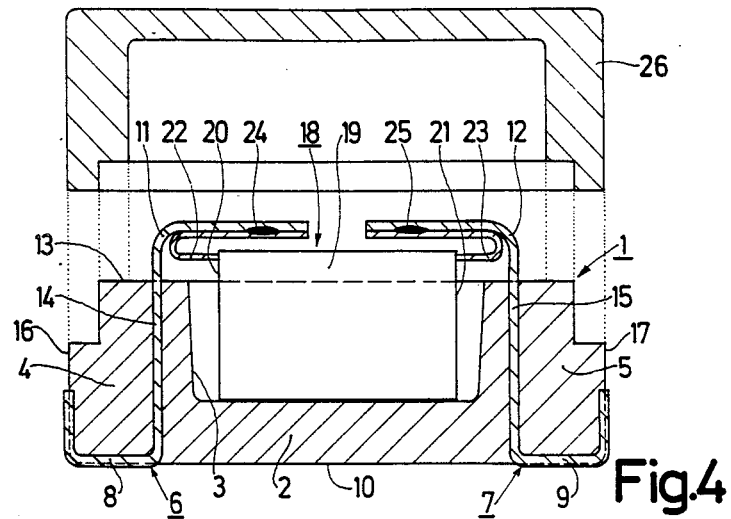
Figure 5:
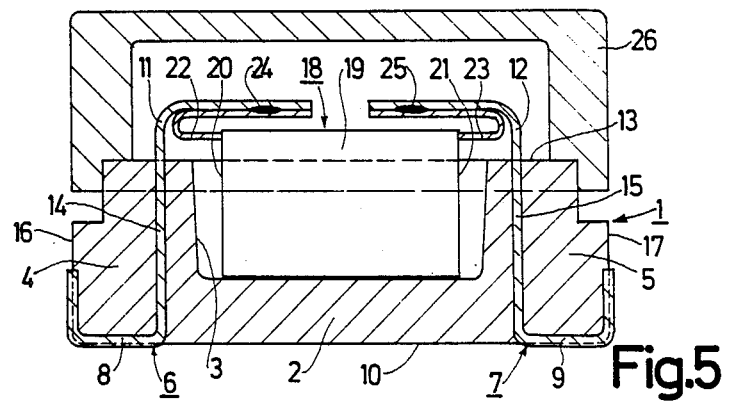
Figure 6:
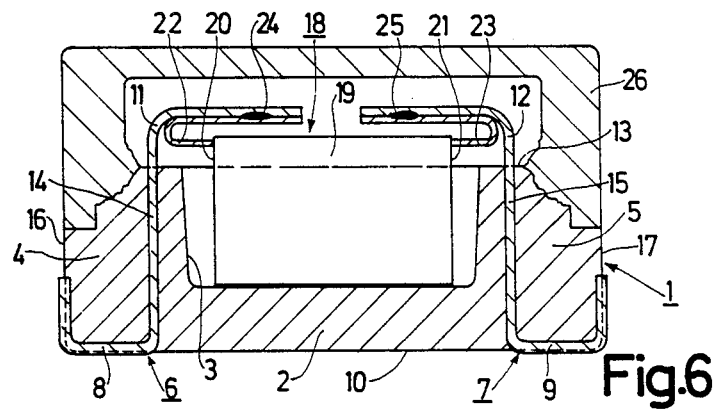
Figure 7:
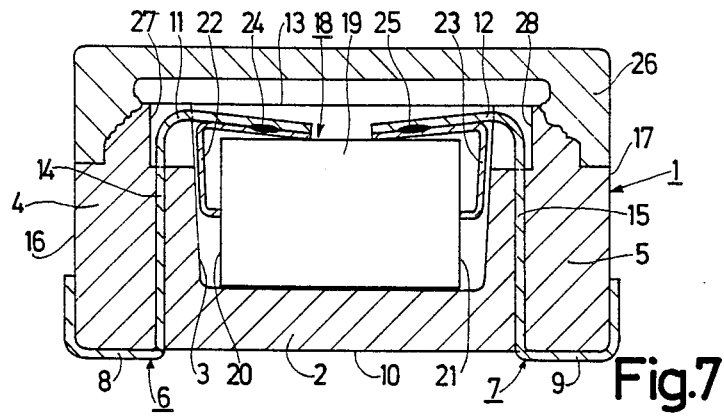
FIGS. 7-23 show, various embodiments of the electrolytic capacitor of the invention
Figure 8:
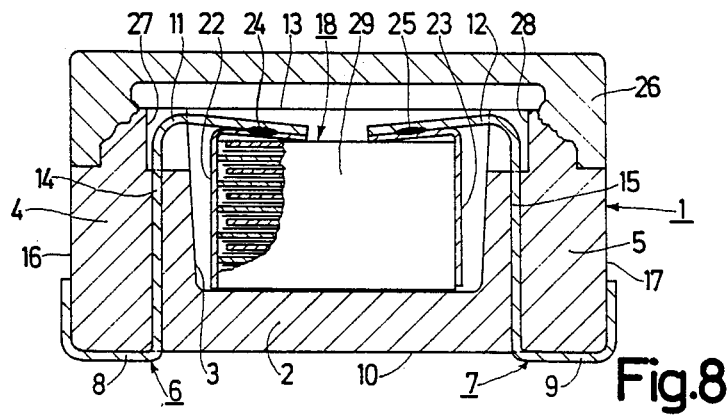
Figure 9:
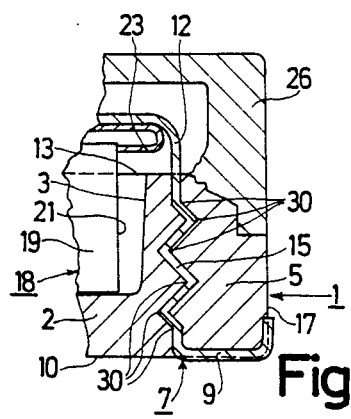
Figure 10:
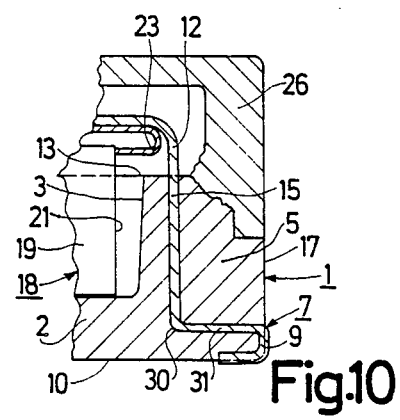
Figure 11:
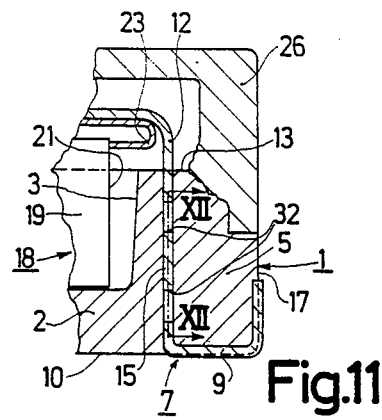
Figure 12:
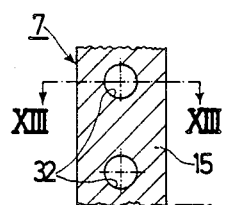
Figure 13:
Figure 14:
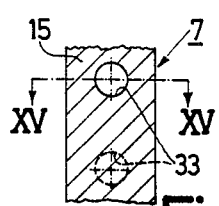
Figure 16:
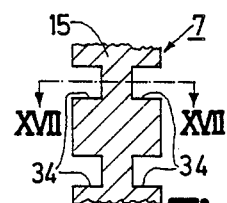
Figure 18:
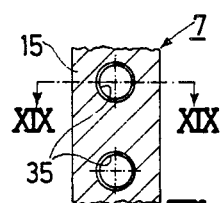
Figure 15:
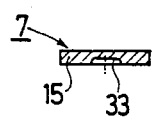
Figure 17:
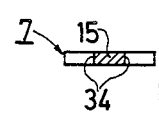
Figure 19:
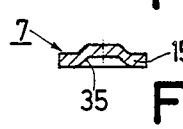
Figure 20:
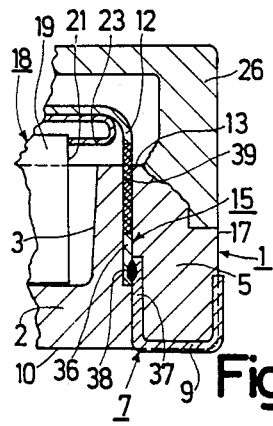
Figure 21:
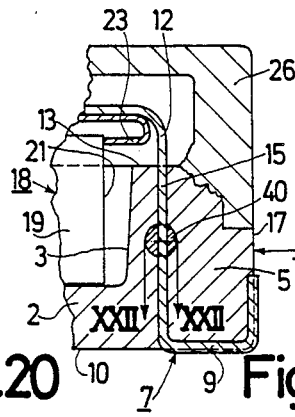
Figure 23:
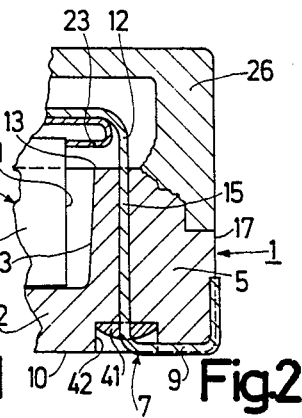
Figure 22:
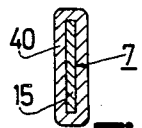

The invention will be explained in more detail below with reference to the drawings in which a number of exemplary embodiments of the invention are depicted, to which it is not, however, intended to be restricted. FIG. 1 shows in longitudinal section a dish-shaped synthetic resin housing section which is designed to receive a capacitor cell and in which two connecting leads are embedded. FIG. 2 shows the dish-shaped housing section as in FIG. 1 into which a capacitor cell, constructed in this case as a capacitor winding, is inserted. FIG. 3 shows the dish-shaped housing section with the capacitor winding inserted into it as in FIG. 2, the connecting leads embedded in the dish-shaped housing section being connected by their ends emerging into the receiving space designed for the capacitor winding to the electrode connections of the capacitor winding. FIG. 4 shows an exploded representation of the dish-shaped housing section with the capacitor winding inserted into it as in FIG. 3 and also a lid-shaped housing section designed for sealing off the dish-shaped housing section, the ends of the connecting leads connected to the electrode connections being angled towards the outside surface of the capacitor winding facing away from the base of the dish-shaped housing section. FIG. 5 shows the dish-shaped housing section with the capacitor winding inserted in it as in FIG. 4 and with the lid-shaped housing section placed on it. FIG. 6 shows the dish-shaped housing section with lid-like housing section placed on it as in FIG. 5, the lid-like housing section being hermetically joined to the dish-shaped housing section and the electrolytic capacitor consequently being finished. FIG. 7 shows a modification of the electrolytic capacitor as in FIG. 6 in which the ends of the connecting leads emerging into the receiving space for the apacitor winding emerge from cutouts provided in the region of the upper side at the insides of the side walls of the dish-shaped housing section and, together with the electrode connections of the capacitor winding connected to them, are angled towards the outside surface of the capacitor winding facing away from the base of the dish-shaped housing section to such an extent that they rest on the capacitor winding and press it against the base of the dish-shaped housing section. FIG. 8 shows a modification of the exemplary embodiment as in FIG. 7 in which the capacitor cell is constructed as a capacitor stack. FIG. 9 shows portions of a modification of the electrolytic capacitor as in FIG. 6 in which a connecting lead has several bends in the region of its portion embedded in the dish-shaped housing section. In a modification of the exemplary embodiment as in FIG. 9, FIG. 10 shows an embodiment in which a connecting lead has, in the region of its portion embedded in the dish-shaped housing section in the region of the base of the dish-shaped housing section, a bend formed as an angulation, with the angled portion of which it emerges from the side wall of the dish-shaped housing section at the outside of the latter. FIG. 11 shows a portion of a further modification of the electrolytic capacitor as in FIG. 6, in which a connecting lead of strip-type construction is provided with two circular cutouts extending transversely to the plane of the strip in the region of their portion which is embedded in the dish-shaped housing section. FIG. 12 shows the portion of the connecting lead having the two cutouts in section along the line XII—XII in FIG. 11. FIG. 13 shows a section along the line XIII—XIII in FIG. 12. FIG. 14 shows, in the manner of representation of FIG. 12, a modification of the exemplary embodiment as in FIG. 11, in which a strip-type connecting lead is provided with two cutouts formed as recesses. FIG. 15 shows a section along the line XV—XV in FIG. 14. FIG. 16 shows, in the manner of representation of FIG. 12, another modification of the exemplary embodiment as in FIG. 11, in which a strip-type connecting lead has two cutouts on each side. FIG. 17 shows a section along the line XVII—XVII in FIG. 16. FIG. 18 shows, in the manner of representation of FIG. 12, a further modification of the exemplary embodiment as in FIG. 11, in which a strip-type connecting lead is provided with two indentations. FIG. 19 shows a section along the line XIX—XIX in FIG. 18. FIG. 20 shows a portion of another modification of the electrolytic capacitor as in FIG. 6 in which a connecting lead, consisting of a valve metal and emerging into the receiving space for the capacitor winding, is provided, at its surface, with a barrier layer encompassing it circumferentially in the region of its portion embedded in the dish-shaped housing section. FIG. 21 shows a portion of a further modification of the electrolytic capacitor as in FIG. 6, in which a connecting lead s surrounded by a sealing element which circumferentially encompasses it annularly and which is completely embedded in the dish-shaped housing section. FIG. 22 shows the connecting lead surrounded by the sealing element in section along the line XXII—XXII in FIG. 21. FIG. 23 shows a modification of the exemplary embodiment as in FIG. 21, in which the sealing element surrounding a connecting lead is disposed immediately adjacent to the portion of the connecting lead embedded in the dish-shaped housing section at its external point of emergence from the dish-shaped housing section adjacent to the same.

A method of the invention for producing an electrolytic capacitor of the invention will now be described with reference to FIGS 1 to 6. The capacitor cell of which capacitor is accommodated in a synthetic resin housing, with connecting leads originating from outside the housing and, portions of led back are embedded in the housing, leading to lateral electrode connections of the capacitor cell and being connected to the latter. In FIG. 1, 1 denotes a dish-shaped housing section which has a base 2 and four side walls which form the boundary of a trough-shaped recess 3 which is designed to receive a capacitor cell. Connecting leads 6 and 7 are embedded in two side walls 4 and 5 situated opposite each other, and this is done in a conventional manner directly during the production of the dish-shaped housing section 1 which consists of synthetic resin. These two connecting leads 6 and 7, which may be of wire-type or striptype construction, are at the same time so disposed that their one end 8 and 9 respectively emerges at the outside 10 of the base 2 and their other end 11 and 12 respectively emerges at the upper side 13 of the dish-shaped housing section 1 in the region of the side walls 4 and 5 of the housing section, portions 14 and 15 of these connecting leads 6 and 7 are considered embedded in the side walls 4 and 5 then extend away from the base essentially parallel to the side walls 4 and 5. The ends 8 and 9 respectively of the connecting leads 6 and 7, which form the external connections of the electrolytic capacitor, are angled along the outside 10 of the base 2 towards the side walls 4 and 5 respectively, and they extend also along a part of the respective outside 16 and 17 respectively of the side wall 4 and 5 respectively so that contact may easily be made to them at these points. The other ends 11 and 12 respectively of the connecting leads 6 and 7 respectively emerging at the upper side 13 of the dish-shaped housing section 1 in the region of its side walls 4 and 5 form an essentially linear continuation of the embedded portions 14 and 15 respectively, the choice of their points of emergence being such that they are subsequently situated in the interior of the receiving space for the capacitor cell formed by the entire housing. The length of the ends 11 and 12 of the connecting leads 6 and 7 is at the same time so dimensioned that they can be angled into the region of the trough-shaped recess 3 without however making contact with each other in the process, which means that under these conditions they do not extend right into the region of the center of the recess 3.

As is shown in FIG. 2, there is now inserted into the recess 3 of such a dish-shaped housing section 1 a capacitor cell 18, here represented symbolically, which in the present case consists of a capacitor winding 19, from whose two lateral end faces 20 and 21 respectively there emerges in each case an electrode connection 22 and 23 respectively which is connected in a conventional manner to one of two wound electrode strips which are insulated from each other. At the same time, the capacitor winding 19 is inserted into the recess 3 so that its electrode connections 22 and 23 come to be situated adjacent to the side walls 4 and 5 in which the connecting leads 6 and 7 are embedded. At the same time the choice of the height of the side walls of the dish-shaped housing section 1 is such that the capacitor winding 19 is essentially surrounded by them in its entirety, the capacitor winding 19 therefore being situated virtually completely inside the recess 3 of the dish-shaped housing section 1. In the present case it is assumed that the electrode connections 22 and 23 of the capacitor winding 19 emerge laterally from its end faces 20 and 21 in the region of the outside surface of the capacitor winding 19 facing away from the base 2 of the dish-shaped housing section, and they are so angled that they extend essentially parallel to the ends 11 and 12 of the connecting leads 6 and 7 and alongside the latter, as shown in FIG. 2.

Subsequently, the ends 11 and 12 of the connecting leads 6 and 7 are connected together to the electrode connections 22 and 23 of the capacitor winding outside the dish-shaped housing section 1, as shown in FIG. 3. Such a connection may be achieved, for example, by a welding operation using ultrasound, using a laser beam or by electrical means, it being possible for said connections, denoted by the reference symbols 24 and 25 respectively, to be produced simply and reliably since they are made completely outside the dish-shaped housing section 1 situated at completely freely accessible points of the ends 11 and 12 of the connecting leads 6 and 7 and the electrode connections 22 and 23.

The ends 11 and 12 of the connecting leads 6 and 7 connected to the adjacent electrode connections 22 and 23 of the capacitor winding 19 are then angled in an L shape towards the outside surface of the capacitor winding 19 facing away from the base 2 of the dish-shaped housing section 1, but no contact occurs in this process since their lengths, as mentioned, have been appropriately chosen. This phase of the manufacturing method is shown in FIG. 4, which also shows a lid-shaped housing section 26 which fits the dish-shaped housing section 1 and completes the housing of the electrolytic capacitor and with which the dish-shaped housing section 1 which receives the capacitor winding 19 essentially in its entirety can be sealed off, in which process, as is evident, the ends 11 and 12 of the connecting leads 6 and 7 come to be situated completely inside the receiving space for the capacitor winding 19 formed by the two housing sections.

FIG. 5 subsequently shows the phase of the production method in which the lid-shaped housing section 26 is placed on the dish-shaped housing section 1. The dish-shaped housing section 1 and the lid-shaped housing section 26 are then hermetically joined to each other, which in the present case is done by an ultrasonic welding operation, the lid-shaped housing section 26 and the side walls of the dish-shaped housing section 1 being partially compressed and joined to each other in a flowing manner in their mutually interacting edge regions. In this manner a particularly good and tight joint of the two housing sections is obtained. Obviously, within the scope of the prior art known for this purpose, still other possibilities are also available for a tight joint of the two housing sections. FIG. 6 shows the electrolytic capacitor finished in this manner.

In such a production method, the capacitor cell 18 may be impregnated with an electrolyte at various phases of the production method. For example, the capacitor winding 19 already impregnated with an electrolyte can be inserted in the dish-shaped housing section 1 in the production phase shown in FIG. 2. However, the electrolyte may also be introduced into the recess 3 only after the insertion of the capacitor winding 19 into the dish-shaped housing section 1 and the capacitor winding 18 may be impregnated in this manner. In both cases the ends 11 and 12 of the connecting leads 6 and 7 are then connected to the electrode connections 22 and 23 of the capacitor winding 19 later. As is evident, under these circumstances there is no risk that electrolyte liquid will enter the region where the ends 11 and 12 of the connecting leads 6 and 7 are connected to the electrode connections 22 and 23 since the respective connecting points are completely outside the dish-shaped housing section 1. Satisfactory and reliable connections 24 and 25 of the ends 11 and 12 of the connecting leads 6 and 7 to the electrode connections 22 and 23 of the capacitor winding 19 are consequently obtained and these are also simple to produce. Expediently, however, the electrolyte may also be introduced into the recess 3 of the dish-shaped housing section 1 only after the ends 11 and 12 have been connected to the electrode connections 22 and 23, subsequent to the phase of the production method shown in FIG. 3, in which case there is then no risk at all that the production of the connections 24 and 25 might be impaired by the presence of the electrolyte liquid. Since the capacitor winding 19, as mentioned, is received virtually in its entirety by the dish-shaped housing section 1, the introduction of the electrolyte into the recess 3 of the dish-shaped housing section 1 and, consequently, the impregnation of the capacitor winding 19 with the electrolyte also take a simple and reliable form.

As a result of the fact that, in such an electrolytic capacitor, the connecting leads 6 and 7 extend away from the base 2 of the dish-shaped housing section 1, essentially parallel to the capacitor cell 18 inside the side walls 4 and 5 of the dish-shaped housing section 1, which receives the capacitor cell 18 virtually in its entirety and is consequently relatively high, to its upper side 13, the portions 14 and 15 of the connecting leads 6 and 7 embedded in the side walls 4 and 5 are relatively long, which also produces a relatively long creep path along the same, which the electrolyte contained in the receiving space for the capacitor cell 18 has to overcome in order to be able to leak out of the housing of the electrolytic capacitor. In this manner, a good sealing is consequently obtained, which is very important for a long service life and satisfactory mode of operation of the electrolytic capacitor. In addition, under these circumstances the connecting leads 6 and 7 are reliably embedded in the dish-shaped housing section 1.

In the exemplary embodiment shown in FIG. 7 the construction of the side walls 4 and 5 of the dish-shaped housing section 1 is so high that the upper side 13 of the dish-shaped housing section 1 projects somewhat above the capacitor winding 19 inserted in the recess 3 so that the capacitor winding 19 is received in the recess 3 in its entirety. In this manner, the capacitor winding 19 can be impregnated with an electrolyte with particular reliability. Here, too, the portions 14 and 15 of the connecting leads 6 and 7 again extend away from the base 2 of the dish-shaped housing section 1, essentially parallel to the capacitor winding 19 or to the side walls 4 and 5 respectively of the dish-shaped housing section 1.

In the present exemplary embodiment, the ends 11 and 12 of the connecting leads 6 and 7 do not, however, emerge directly at the upper side 13 of the dish-shaped housing section 1 from the side walls 4 and 5 of the latter, but from cutouts 27 and 28 provided in the region of the upper side 13 on the insides of the side walls 4 and 5. As a result of this, a reduction in the necessary overall height for the lid-shaped housing sections 26 is possible since the ends 11 and 12 of the connecting leads 6 and 7 connected to the electrode connections 22 and 23 of the capacitor winding 19 can be angled in an L shape, starting directly from the cutouts 27 nd 28 towards the outside surface of the capacitor winding 19 facing away from the base 2 of the dish-shaped housing section 1. Since, in the present case, the side walls 4 and 5 project somewhat above the capacitor winding 19 inserted in the recess 3, sufficient overall height of the side walls 4 and 5 is available, despite the provision of the cutouts 27 and 28, for it to be possible to embed the connecting leads 6 and 7 reliably in the side walls 4 and 5 over appropriately long portions 14 and 15, which again produces a relatively long creep path for the electrolyte contained in the receiving space for the capacitor winding 19 and, consequently, the risk of a leakage of the electrolyte from the housing of the electrolytic capacitor is reduced.

Furthermore, in the present exemplary embodiment, the ends 11 and 12 of the connecting leads 6 and 7 connected to the electrode connections 22 and 23 of the capacitor winding 19 are angled in an L shape towards the outside surface of the capacitor winding 19 to such an extent that they jointly rest on the capacitor winding 19 and press the latter against the base 2 of the dish-shaped housing section 1. As a result of this, the capacitor winding 19 is firmly and securely held in the recess 3 of the dish-shaped housing section 1 and also protected against vibrations to which the electrolytic capacitor may be exposed, as a result of which a satisfactory mode of operation and longer service life of the electrolytic capacitor are likwise obtained. As can be seen from FIG. 7, it is assumed in the present exemplary embodiment that the electrode connections 22 and 23 emerge centrally from the end faces 20 and 21 of the capacitor winding 19, which in no way impedes their satisfactory connection to the ends 11 and 12 of the connecting leads 6 and 7 since said connections 24 and 25 are again made completely outside the dish-shaped housing section 1 analogously to the production phase of the exemplary embodiment described above which is shown in FIG. 3.

FIG. 8 shows an electrolytic capacitor whose housing has the same construction as that of the electrolytic capacitor in the exemplary embodiment according to FIG. 7. In the present exemplary embodiment, however, a capacitor cell 18 is used which is formed by a capacitor stack 29 which again has lateral electrode connections 22 and 23 which in this case join the individual mutually insulated stacked electrode layers alternately to each other in sequence in a conventional manner. In this exemplary embodiment, too, the ends 11 and 12 of the connecting leads 6 and 7 connected to the electrode connections 22 and 23 of the capacitor stack 29 are angled in an L shape towards the top face of the capacitor stack 29 facing away from the base 2 of the dish-shaped housing section 1 to such an extent that they jointly rest on the capacitor stack 29 and press the latter against the base 2 of the dish-shaped housing section.

As already mentioned, a reliable embedding of the connecting leads 6 and 7 in the side walls 4 and 5 of the dish-shaped housing section 1 is particularly important in order to obtain a good sealing of the housing of the electrolytic capacitor so that no electrolyte can escape from the housing along said embeddings. For this purpose, there are a number of possible additional measures as is explained below. In this connection, in the exemplary embodiment shown in FIG. 9 provision is made for the portion 15 of the connecting lead 7 embedded in the side wall 5 not to extend linearly within the side wall 5 as in the exemplary embodiments described above but, in the present case, to have a plurality of bends 30. These bends 30 are so formed here that they produce a zigzag course for part of the embedded portion 15 of the connecting lead 7. It would, however, also be readily possible for the bends 30 to be formed so that, for example, an undulating or meandering course is produced. In this manner, two objects are achieved, namely that, on the one hand, the length of the portion 15 of the connecting lead 7 embedded in the side wall 5 is increased and, consequently, the creep path along the embedded portion is also extended and, on the other hand, a more reliable and more secure embedding of the connecting lead 7 is obtained as a result of the material of the side wall 5 adapting to the bend 30. Both circumstances produce a better sealing of the housing of the electrolytic capacitor in the region of the embedding of the respective connecting lead.

In the exemplary emodiment in FIG. 10, the portion 15 of the connecting lead 7 embedded in the side wall 5 has, in the region of the base 2 of the dish-shaped housing section 1, a single bend 30, essentially formed as an angulation, with the angled portion 31 of which the connecting lead 7 emerges from the side wall 5 at the outside 17 of the side wall is, the end 9 of the connecting lead 7, which forms the external connection of the electrolytic capacitor, then being angled along said outside 17 towards the outside 10 of the base 2 of the dish-shaped housing section 1, this being done in an analogous manner to the exemplary embodiment described in FIGS. 1 to 6. The provision of such a bend 30, formed as an angulation, will likewise produce a very reliable embedding of the connecting lead 7 in the dish-shaped housing section 1, the length of the embedding and, consequently, the creep path being extended to reduce the risk of electrolyte leaking from the housing of the electrolytic capacitor.

In the exemplary embodiment shown in FIGS. 11, 12 and 13, in order to achieve a more reliable embedding of the portion 15 of the connecting leads 7 in the side wall 5 of the dish-shaped housing section 1, provision is made, in the case of a strip-type construction of the connecting lead 7, for the housing section 1 to have, in the region of its embedded portion 15, two cutouts 32 extending transversely to the plane of the strip, which, in the present case, pierce the connecting lead 7, which cutouts reduce the cross-sectional area of the connecting lead in their vicinity. During the production of the dish-shaped housing section 1, the material of the latter penetrates said cutouts 32 and, consequently, anchors the connecting lead 7 inside the side wall 5, a formation of crevices extending along the embedding of the connecting lead 7 as a consequence of different shrinkage and expansion behaviors of the housing and of the connecting lead being prevented. Obviously, the number of the cutouts provided can be chosen as desired. Thus, for example, it is also possible for only one such cutout to be provided or more than two such cutouts may also be provided. There are equally a number of possibilities for the shape of the cutouts. In the present exemplary embodiment the cutouts 32 are formed as circular openings inside the strip-type connecting lead 7. Equally, however, said cutouts could also, for example, be of triangular or rectangular shape. It is also not absolutely necessary that the cutouts penetrate the strip-type connecting lead completely and therefore be formed as through openings, but the cutouts could, for example, also be formed, as is shown in the exemplary embodiment in FIGS. 14 and 15, only as recesses 33, in which case they also reduce the cross-sectional area of the connecting lead 7 in their vicinity. If a plurality of such recesses 33 are provided, these may then be provided alternatingly on the two main surfaces of the strip-type connecting lead 7, as is shown in the present exemplary embodiment. Such cutouts do not necessarily have to be provided inside the connecting lead 7 of strip-type construction, but they could also, as is shown in the exemplary embodiment in FIGS. 16 and 17, be provided in the edge region of the strip-type connecting lead 7, the cutouts denoted in this case by the reference symbols 34 forming, for example, a meandering boundary of the connecting lead 7 on both side. Obviously, the cutouts in the exemplary embodiments cited above could also be used in combination with each other.

In the exemplary embodiment shown in FIGS. 18 and 19, to achieve a more reliable embedding of the portion 15 of the connecting lead 7 of strip-type construction in the side wall 5 of the dish-shaped housing section 1, provision is made for the connecting lead 7 to have, in the region of its embedded portion 15, two indentations 35, extending transversely to the plane of the strip, which are produced for example by a stamping operation without under these circumstances reducing the cross-sectional area of the connecting lead in the vicinity of said indentations 35. In this case, too, during the production of the dish-shaped housing section, material of the latter penetrates the indentations 35 and, consequently, anchors the connecting lead inside the respective side wall. Obviously, various possibilities exist in relation to this exemplary embodiment for the shaping and arrangement of such indentations, analogously to the possibilities, described with reference to FIGS. 11 to 17, for the shaping and arrangement of the cutouts 32, 33 and 34 provided there in the case of those exemplary embodiments.

It is known to be necessary for a satisfactory mode of operation of an electrolytic capacitor that the ends of the connecting leads emerging into the receiving space for the capacitor cell consist of a valve metal, for example of high purity aluminum, so that the electrical properties of the electrolytic capacitor are not impaired by interaction with the electrolyte. Thus, for example, the entire connecting leads may consist of a valve metal, their ends extending outside the housing and forming the external connections of the electrolytic capacitor then being rendered solderable, which may, for example, be carried out by tinning. As is shown in the exemplary embodiment in FIG. 20, the connecting leads, in the present case the connecting lead 7, may also, however, consist of two parts 36 and 37 connected to each other, in which case the part 36 of the connecting lead 7, which emerges at the end 12 into the receiving space for the capacitor winding 19, then consists of a valve metal and the other part 37, which leads at the end 9 to the outside 10 of the dish-shaped housing section 1 and forms one external connection for the electrolytic capacitor, consists of a different solderable conducting metal, such as for example tinned bronze. In the present exemplary embodiment, the joint 38 of the two parts 36 and 37 is situated in the region of the portion 15 of the connecting lead 7 which is embedded in the side wall 5 of the dish-shaped housing section 1. Such a joint of the connecting lead of two-part construction could per se, however, also be situated, for example, on the outside of the housing.

The part 36, consisting of a valve metal, of the connecting lead 7 is now provided with a barrier layer 39 which embraces it circumferentially essentially in the region of the portion 15 embedded in the dish-shaped housing section 1 except for a part of the end 12 emerging into the receiving space for the capacitor winding 19. Conventionally, such a barrier layer consists of an oxide layer which is formed by means of a forming electrolyte, its thickness determining the barrier voltage of the barrier layer. Such a barrier layer produces a surface formation of the connecting lead which interacts with the plastic material of the dish-shaped housing section in which the connecting lead is embedded to produce an improved adhesion characteristic, which produces a more reliable embedding of the connecting lead in the dish-shaped housing section. Under these circumstances, it has proven to be expedient if the choice of the thickness of the barrier layer 39 is such that the barrier voltage of the barrier layer 39 is higher than the voltage with which the capacitor winding 19 is formed in accordance with its operating voltage. In this manner, in the region of a connecting lead of the capacitor winding on the anode side, the electrocapillary forces which favor a leakage of electrolyte in the region of said connecting lead of the capacitor winding on the anode side are almost completely eliminated, which produces a further improvement of the sealing of the housing.

Another possibility for improving the sealing of the housing of the electrolytic capacitor in the region of the embedding of the connecting leads in the same is shown in the exemplary embodiment in FIGS. 21 and 22. Here the connecting lead 7 is surrounded, in the region of its portion 15 embedded in the dish-shaped housing section 1, by a sealing element 40 which adheres firmly to the connecting lead and circumferentially encompasses it annularly and which consists of a synthetic resin, said sealing element 40 being completely embedded in the present case in the dish-shaped housing section 1. Preferably, the sealing element 40 consists of a heat-resistant, elastically compliable synthetic resin such as, for example, a silicone rubber. In this manner, a particularly reliable sealing is obtained around the connecting lead 7 embedded in the dish-shaped housing section 1, very largely independently of the choice of material for the dish-shaped housing section 1, since the different shrinkage and expansion behaviors of the dish-shaped housing section 1 and the connecting lead 7 can be particularly reliably compensated for by means of such a sealing element. Obviously, a plurality of such sealing elements 40 could also be disposed consecutively in the region of the portion 15 of the connecting lead 7.

In the exemplary embodiment shown in FIG. 23, a sealing element as specified above, which in this case is denoted by the reference symbol 41, is disposed immediately adjacent to the portion 15 of the connecting lead 7 embedded in the dish-shaped housing section 1 at one or both of its two points of emergence from the dish-shaped housing section 1 and adjacent to the same. In the present case, said sealing element 41 is disposed in a recess 42 provided at the outside 10 of the base 2 of the dish-shaped housing section 1, as a result of which it annularly encompasses the end 9, immediately adjacent to the outside 10 of the dish-shaped housing section 1, which adjoins the portion 15 of the connecting lead 7 embedded in the dish-shaped housing section 1 and emerges from the dish-shaped housing section 1 at its outside 10 and which forms an external connection of the electrolytic capacitor. In this manner, the point of emergence of the connecting lead from the dish-shaped housing section is satisfactorily and reliably sealed. Obviously, it would also be possible to provide such a sealing element at the point of emergence of the portion 15 situated in the interior of the receiving space for the capacitor winding in the region of the end 12 of the connecting lead 7 adjacent to it. Equally, it would, of course, also be possible to provide, in addition to a sealing element as shown in FIGS. 21 and 22, a further sealing element 41 as shown in FIG. 23 in addition.

As is evident from the above, there are a number of possibilities for modifying the exemplary embodiments described without at the same time departing from the scope of the invention. This applies, in particular, in relation to the measures through which an additional improvement is achieved in the sealing of the housing of the electrolytic capacitor in the region of the connecting leads embedded in the same, it being possible for the individual measures described also to be used in combination with each other.

What is claimed is:

1. Electrolytic capacitor having a synthetic resin housing which forms a receiving space for a capacitor cell and which consists of a dish-shaped housing section which essentially accommodates the capacitor cell having lateral electrode connections, and a lid-shaped housing section which hermetically seals said dish-shaped housing section, connecting leads, which originate from outside the dish-shaped housing section, emerge at one end into the receiving space for the capacitor cell and are connected at said end to the adjacent electrode connection of the capacitor cell, being embedded in the side walls of the dish-shaped housing section adjacent to the electrode connections of the capacitor cell, characterized in that the connecting leads embedded in the side walls of the dish-shaped housing section extend at least for a portion, in the direction away from the base of the dish-shaped housing section, essentially parallel to the capacitor cell and in that the ends of the connecting leads which emerge into the receiving space for the capacitor cell and are connected to the adjacent electrode connections of the capacitor cell are angled in an L shape towards the face of the capacitor cell facing away from the base of the dish-shaped housing section without making contact with each other.

2. Electrolytic capacitor as claimed in claim 1, characterized in that the ends of the connecting leads angled towards the capacitor cell in an L shape, together with the electrode connections connected to them, rest on the capacitor cell and press the latter against the base of the dish-shaped housing section.

3. Electrolytic capacitor as claimed in claim 1, characterized in that the connecting leads have at least one bend in their course in the region of their portions embedded in the dish-shaped housing section.

4. Electrolytic capacitor as claimed in claim 3, characterized in that the connecting leads have a bend essentially formed as an angulation in the region of the base of the dish-shaped housing section and emerge from the side wall of the dish-shaped housing section on the outside thereof with the angled portion of the said bend.

5. Electrolytic capacitor as claimed in claim 1 and having connecting leads of strip-type construction, characterized in that the connecting leads are provided, in the region of their portions embedded in the dish-shaped housing section, with at least one cutout which extends transversely to the plane of the strip and which reduces the cross-sectional area of the connecting leads in the region thereof.

6. Electrolytic capacitor as claimed in claim 1 and having connecting leads of strip-type construction, characterized in that the connecting leads are provided, in the region of their portions embedded in the dish-shaped housing section, with at least one indentation which extends transversely to the plane of the strip.

7. Electrolytic capacitor as claimed in claim 1 in which at least the connecting leads emerging into the receiving space for the capacitor cell consist of a valve metal, characterized in that the connecting leads consisting of a valve metal are provided, at least in the region of their portions embedded in the dish-shaped housing section, at least partially on their surface with a barrier layer encompassing them circumferentially.

8. Electrolytic capacitor as claimed in claim 7, characterized in that the chosen barrier voltage of the barrier layer is higher than the voltage with which the capacitor cell is formed in accordance with its operating voltage.

9. Electrolytic capacitor as claimed in claim 1, characterized in that the connecting leads are surrounded by at least one sealing element adhering firmly to the connecting leads, circumferentially encompassing them annularly and consisting of a synthetic resin, at least essentially in the region of their portions embedded in the dish-shaped housing section.

10. Electrolytic capacitor as claimed in claim 9, characterized in that the sealing element consists of a heat-resistant elastically compliant synthetic resin.

11. Electrolytic capacitor as claimed in claim 9, characterized in that at least one sealing element surrounding a connecting lead is completely embedded in the dish-shaped housing section.

12. Electrolytic capacitor as claimed in claim 9, characterized in that at least one sealing element surrounding a connecting lead is disposed immediately adjacent to the portion of the connecting lead embedded in the dish-shaped housing section at one or both of its two points of emergence from the dish-shaped housing section, adjacent to the same.

13. Method for producing n electrolytic capacitor as claimed in claim 1, in which connecting leads which originate from outside the housing section of dish-shaped construction are embedded in the side walls of the same, one end of which connecting leads emerges into a receiving space designed for a capacitor cell, after which the capacitor cell, provided with lateral electrode connections, is inserted into the dish-shaped housing section with said electrode connections adjacent to the ends of the connecting leads emerging into the receiving space designed for the capacitor cell and the electrode connections are connected to said ends of the connecting leads, and subsequently a lid-shaped housing section is placed on the dish-shaped housing section and hermetically joined to the latter, wherein at least portions of the connecting leads are embedded in the side walls, in the direction away from the base of the dish-shaped housing section, extending essentially parallel to the side walls of the latter, wherein their ends emerging into the receiving space designed for the capacitor cell are of such long construction that, extending essentially parallel to the side walls, they project beyond the dish-shaped housing section, wherein the capacitor cell is then inserted into the dish-shaped housing section with its lateral, angled electrode connections extending parallel to the capacitor cell, after which its electrode connections outside the dish-shaped housing section are connected, in the region of the ends of the connecting leads projecting beyond the dish-shaped housing section, to the latter and wherein subsequently, said ends of the connecting leads projecting beyond the dish-shaped housing section, together with the electrode connections of the capacitor cell connected fo them, are angled in an L shape towards the face of the capacitor cell facing away from the base of the dish-shaped housing section without making contact with each other, after which the lid-shaped housing section is placed on the dish-shaped housing section and the two housing sections are hermetically joined to each other.

14. Method as claimed in claim 13, characterized in that the in the course of angling the ends of the connecting leads projecting beyond the dish-shaped housing section, together with the electrode connections connected to them, towards the face of the capacitor cell facing away from the base of the dish-shaped housing section, said leads are pressed against the face of the capacitor cell facing away from the base of the dish-shaped housing section and, consequently, the capacitor cell is held pressed against the base of the dish-shaped housing section.

* * * * *